（12) United States Patent
Nielsen et al.

(10) Patent No.: US 8,848,340 B2
(45) Date of Patent: Sep. 30, 2014

(54) METHOD FOR JOINING DISSIMULAR SEPARATOR MATERIALS

(75) Inventors: Christian S. Nielsen, River Falls, WI (US); Timothy T. Bomstad, Inver Grove Heights, MN (US); Frank T. Greenwald, Mounds View, MN (US)

(73) Assignee: Medtronic, Inc., Minneapolis, MN (US)

( * ) Notice: Subject to any disclaimer, the term of this patent is extended or adjusted under 35 U.S.C. 154(b) by 288 days.

(21) Appl. No.: 13/492,019

(22) Filed: Jun. 8, 2012

(65) Prior Publication Data

US 2012/0250223 A1  Oct. 4, 2012

Related U.S. Application Data

(63) Continuation of application No. 12/512,868, filed on Jul. 30, 2009, now Pat. No. 8,199,459.

(51) Int. Cl.
*H01G 9/08* (2006.01)
*B29C 65/00* (2006.01)
*H01G 9/06* (2006.01)
*H01G 9/02* (2006.01)
*B29C 65/18* (2006.01)

(52) U.S. Cl.
CPC .......... *A16N 1/375* (2013.01); *B29C 66/73115* (2013.01); *B29C 66/1312* (2013.01); *B29C 66/30326* (2013.01); *B29C 66/727* (2013.01); *B29C 66/71* (2013.01); *B29C 66/433* (2013.01); *B29C 66/54* (2013.01); *H01G 9/06* (2013.01); *B29C 66/723* (2013.01); *H01G 9/02* (2013.01); *B29C 65/18* (2013.01); *B29C 66/543* (2013.01); *B29C 66/919* (2013.01)
USPC ........... 361/517; 361/508; 361/509; 361/516; 361/518; 361/525

(58) Field of Classification Search
USPC ................. 361/517, 508, 509, 516, 518–519, 361/523–525, 528, 529, 530, 535–536
See application file for complete search history.

(56) References Cited

U.S. PATENT DOCUMENTS 4,555,293 A   11/1985   French
5,522,851 A   6/1996   Fayram
(Continued)

FOREIGN PATENT DOCUMENTS

EP   0557537   9/1993
WO   02/02186   1/2002

OTHER PUBLICATIONS

Venkat, Sri et al., "Sealing Plastic Seams with Laser Welding Advances in Laser Technology Have Made Laser Welding a Cost-effective and Versatile Tool for Joining Plastics in Medical Devices;" Laser Welding (MD&DI May 2008)—www.devicelink.com/grabber.php3?URL=http://www.devicelink.com/mmdi/archive/08/05/004.html.

(Continued)

*Primary Examiner* — Nguyen T Ha
(74) *Attorney, Agent, or Firm* — Carol F. Barry

(57) ABSTRACT

An energy storage device includes a first conductor having a first surface and a second surface. The energy storage device also includes a second conductor and a separator assembly that encloses the first conductor and that is disposed between the first and second conductors. The separator assembly also includes a first portion that covers the first surface and a second portion that covers the second surface. The first and second portions are attached to one another, and at least one of the first and second portions includes a first sheet and a second sheet that are attached to one another. The first sheet includes a first material, and the second sheet includes a second material that is different from the first material.

12 Claims, 7 Drawing Sheets

(56) References Cited

U.S. PATENT DOCUMENTS

| | | | |
|---|---|---|---|
| 6,141,205 | A | 10/2000 | Nutzman et al. |
| 6,307,733 | B1 * | 10/2001 | Maruyama et al. ............ 361/511 |
| 6,321,114 | B1 | 11/2001 | Nutzman et al. |
| 6,716,778 | B1 | 4/2004 | Hottner |
| 6,801,424 | B1 | 10/2004 | Nielsen et al. |
| 6,850,405 | B1 | 2/2005 | Mileham et al. |
| 6,859,353 | B2 | 2/2005 | Elliott et al. |
| 7,948,740 | B2 * | 5/2011 | Funahashi et al. ............. 361/523 |
| 8,179,666 | B2 * | 5/2012 | Hasegawa ...................... 361/540 |
| 8,320,104 | B2 * | 11/2012 | Fujimoto ....................... 361/511 |
| 8,363,385 | B2 * | 1/2013 | Yoshimitsu ................... 361/523 |
| 8,432,664 | B2 * | 4/2013 | Hirota et al. ................... 361/518 |
| 2005/0190530 | A1 | 9/2005 | Muffoletto et al. |
| 2006/0165939 | A1 | 7/2006 | Hottner |
| 2007/0201186 | A1 | 8/2007 | Norton et al. |
| 2008/0060741 | A1 | 3/2008 | Privitera et al. |
| 2008/0068779 | A1 | 3/2008 | Restorff et al. |

OTHER PUBLICATIONS

P0032173.01 (PCT/US2010/043368) PCT Notification of Transmittal of the International Search Report and the Written Opinion of the International Searching Authoritiy.

* cited by examiner

METHOD FOR JOINING DISSIMULAR SEPARATOR MATERIALS

RELATED APPLICATION

This application is a divisional of U.S. patent application Ser. No. 12/512,868, filed Jul. 30, 2009 entitled "METHOD FOR JOINING DISSIMILAR SEPARATOR MATERIALS", herein incorporated by reference in its entirety.

FIELD

The present disclosure relates to a separator for an energy storage device and, in particular, a method for joining dissimilar separator materials.

INTRODUCTION

Certain medical systems are designed to be implanted within a patient's body, such as implantable pulse generators (IPGs) and implantable cardioverter defibrillators (IPDs). In some cases, these implantable systems include an energy storage device, such as a capacitor or a battery, for powering certain components.

For instance, a capacitor can include an anode, a cathode, a separator and a dielectric member that are disposed between the anode and cathode, an electrolyte, and a case for enclosing the anode, cathode, separator, dielectric, and electrolyte. These components can be adapted for providing power at a high efficiency for a relatively long operating life. Also, the components can be arranged compactly within the housing, such that the device can be readily implanted within a patient. The separator, in particular, can be an important component of these systems.

The separator can include a sheet of material that is wrapped around the anode to be disposed between the anode and the cathode. The sheet is typically made out of a single material. The separator can physically separate the anode and provide cushioned support of the anode to reduce the likelihood of damage due to excessive vibration or other mechanical forces. Also, the separator can provide a thermal barrier between the anode and cathode and can take up physical space within the housing to keep the anode in position relative to the cathode such that the capacitor operates according to desired specifications.

The present teachings provide a method of manufacturing a separator in a convenient and time efficient manner. The separator of the present teachings provides an effective thermal and mechanical barrier between the anode and the cathode such that the energy storage device can operate properly over a relatively long operating life.

SUMMARY

This section provides a general summary of the disclosure, and is not a comprehensive disclosure of its full scope or all of its features.

Various embodiments of an energy storage device according to the present teachings are disclosed. The energy storage device includes a first conductor having a first surface and a second surface. The energy storage device also includes a second conductor and a separator assembly that encloses the first conductor and that is disposed between the first and second conductors. The separator assembly also includes a first portion that covers the first surface and a second portion that covers the second surface. The first and second portions are attached to one another, and at least one of the first and second portions includes a first sheet and a second sheet that are attached to one another. The first sheet includes a first material, and the second sheet includes a second material that is different from the first material.

The present teachings also provide a method of manufacturing an energy storage device. The method includes covering a first surface of a first conductor with a first portion of a separator assembly. The method also includes covering a second surface of the first conductor with a second portion of the separator assembly. Furthermore, the method includes attaching the first and second portions together. At least one of the first and second portions includes a first sheet and a second sheet. The first and second sheets include different materials. The method additionally includes attaching the first and second sheets together.

In various embodiments, the present teachings further provide a capacitor that includes a case, an anode disposed within the case, and a cathode disposed within the case. The cathode has a first cathode component and a second cathode component. Furthermore, the capacitor includes a separator assembly that substantially encloses the anode, and the separator assembly is disposed between the anode and the first and second cathode components. The separator assembly includes a first portion that covers a first surface of the anode and a second portion that covers the second surface of the anode. The first and second portions each include a flange, and the flanges extend over each other and are attached to each other. The first and second portions each include a first sheet with a random and a regular layer. The first and second portions also each include a porous sheet that is layered over the respective first sheet. The random layer has a plurality of fibers that are arranged in random manner, and the regular layer has a plurality of fibers that are arranged in a substantially regular manner. The porous sheet includes a plurality of pores. Furthermore, the random layer of each of the first and second portions abut the anode, and the regular layer of each of the first and second portions are disposed between the respective random layer and the respective porous sheet. The random layers are flowed into and solidified in the pores of the first portion and in the pores of the second portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected exemplary embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings.

Figure 1:
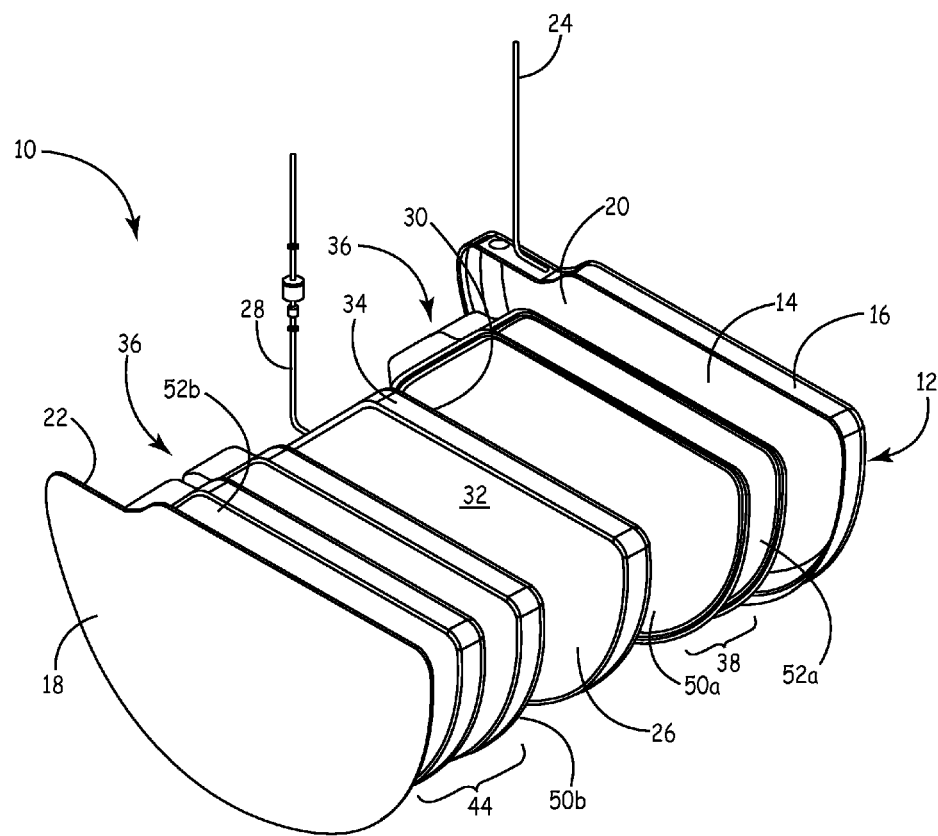
FIG. 1 is an exploded perspective view of an energy storage device according to various exemplary embodiments of the present disclosure.

Referring initially to FIG. 1, an energy storage device 10 is illustrated. The energy storage device 10 can be of any suitable type, such as a capacitor, battery, and the like. Furthermore, the energy storage device 10 can be used for powering any suitable device, such as an implantable cardiac device (e.g., pacemaker, defibrillator, etc.).

As shown, the energy storage device 10 can include a first case component 12. The first case component 12 can include a D-shaped plate 14 with an integrally attached case wall and weld flange 16 that extends in one direction from the periphery of the plate 14. The energy storage device 10 can also include a second case component 18. The second case component 18 can be D-shaped and relatively thin and flat. The case wall and weld flange 16 of the first case component 12 can be fixed to the periphery of the second case component 18, for instance, by a continuous weld. As such, the first and second case components 12, 18 (collectively, the case of the energy storage device 10) can cooperate to enclose various components of the energy storage device 10 as will be described in greater detail below.

The energy storage device 10 can also include a first cathode component 20. The first cathode component 20 can be coated on the plate 14 of the first case component 12 on the same side as the flange 16. Likewise, the energy storage device 10 can include a second cathode component 22, which can be coated on the second case component 18 facing the first case component 12. It will be appreciated that the first and second cathode components 20, 22 can collectively operate as a cathode for the energy storage device 10 as will be discussed in greater detail below.

Moreover, the energy storage device 10 can include a cathode lead 24. The cathode lead 24 can extend through the flange 16 of the first case component 12 to the outside of the device 10. Furthermore, the cathode lead 24 can be electrically connected to the first and second cathode components 20, 22. As such, the first and second cathode components 20, 22 can be electrically connected to external components (not shown) via the cathode lead 24.

Additionally, the energy storage device 10 can include an anode 26. The anode 26 can be generally flat and D-shaped to include a first surface 30, a second surface 32, and an anode periphery 34. As shown in FIG. 1, the anode 26 can be enclosed by the first and second case components 12, 18, and the anode 26 can be surrounded on either side by the first and second cathode components 20, 22. The energy storage device 10 can also include an anode lead 28 that extends through the flange 16 of the first case component 12 to the outside. The anode lead 28 can also be electrically connected to the anode 26.

It will be appreciated that the anode 26 and the cathode components 20, 22 can be made out of any suitable materials. For instance, in some embodiments, the anode 26 is made out of a valve metal, such as titanium, tantalum, zirconium, aluminum, hafnium, niobium, tungsten, yttrium, molybdenum and vanadium. Also, the first and second cathode components 20, 22 can be made out of any high capacitance material (e.g., carbon, ruthenium dioxide, or other suitable material known by one skilled in the art). Furthermore, the first and second case components 12, 18 can be made out of any suitable material, such as titanium. The device 10 can include any components or materials included in U.S. Pat. No. 7,224,576, 7,459,369, 7,499,260, or 5,469,325, each of which is incorporated herein by reference in its entirety.

The energy storage device 10 can also include one or more dielectric members (not shown) and an electrolyte (not shown) between the anode 26 and the cathode components 20, 22 such that the anode 26 and cathode components 20, 22 can store energy, for instance, in a manner similar to a capacitor. As such, the anode 26 and cathode components 20, 22 can be separated by the dielectric member(s), and a voltage potential difference can build up between the anode 26 and the cathode components 20, 22 to generate an electrical field in the dielectric member(s). When desired, the anode 26 and cathode components 20, 22 can build up charge and discharge via the leads 24, 28. The leads 24, 28 can be electrically connected to external components, such as a control assembly of an implantable cardiac device, in order to provide power thereto and in order to provide a cardiac signal to cardiac tissue.

It will be appreciated that the anode 26 can be considered a first conductor (i.e., first electrode) of the energy storage device 10, and the cathode components 20, 22 can be collectively considered a second conductor (i.e., a second electrode), and vice versa. It will also be appreciated that the anode 26 and cathode components 20, 22 can be reversed in position. For instance, the energy storage device 10 could include a single cathode surrounded by a plurality of anode components. Furthermore, it will be appreciated that the energy storage device 10 can include a single anode 26 and a single cathode component 20, 22 without departing from the scope of the present disclosure. Additionally, it will be appreciated that the anode 26 and the cathode components 20, 22 can have any suitable shape without departing from the scope of the present disclosure.

Figure 2:
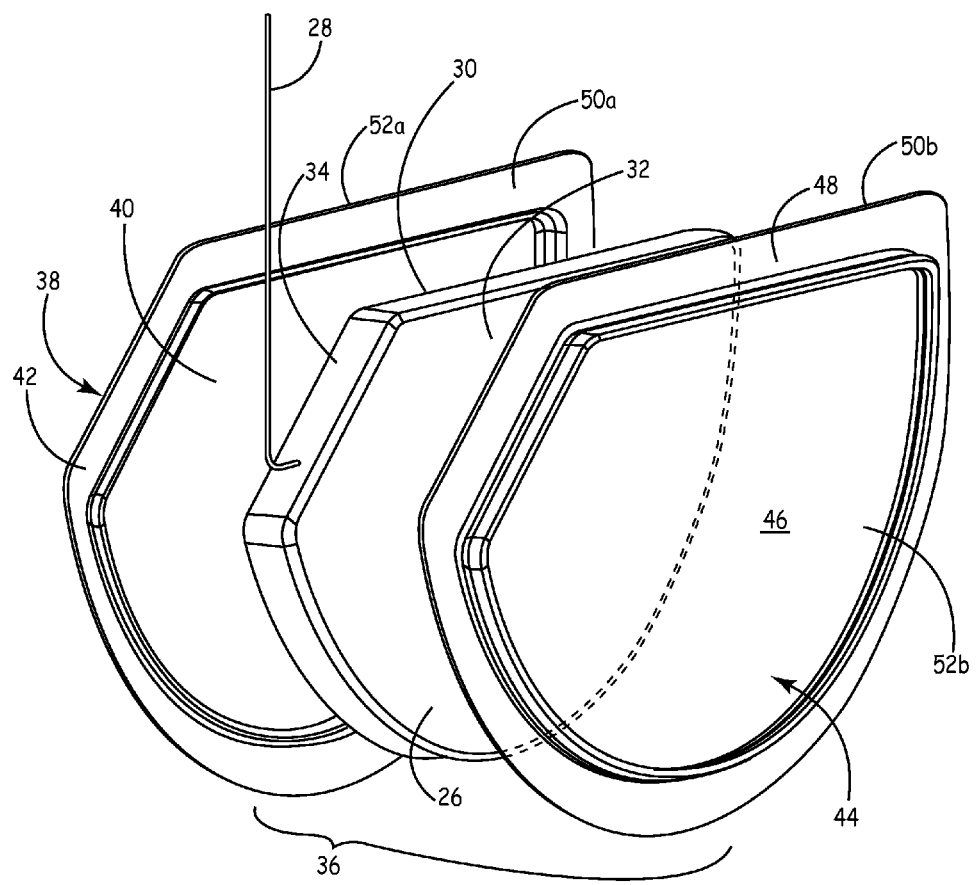
FIG. 2 is an exploded perspective view of certain components of the energy storage device of FIG. 1.
Figure 3:
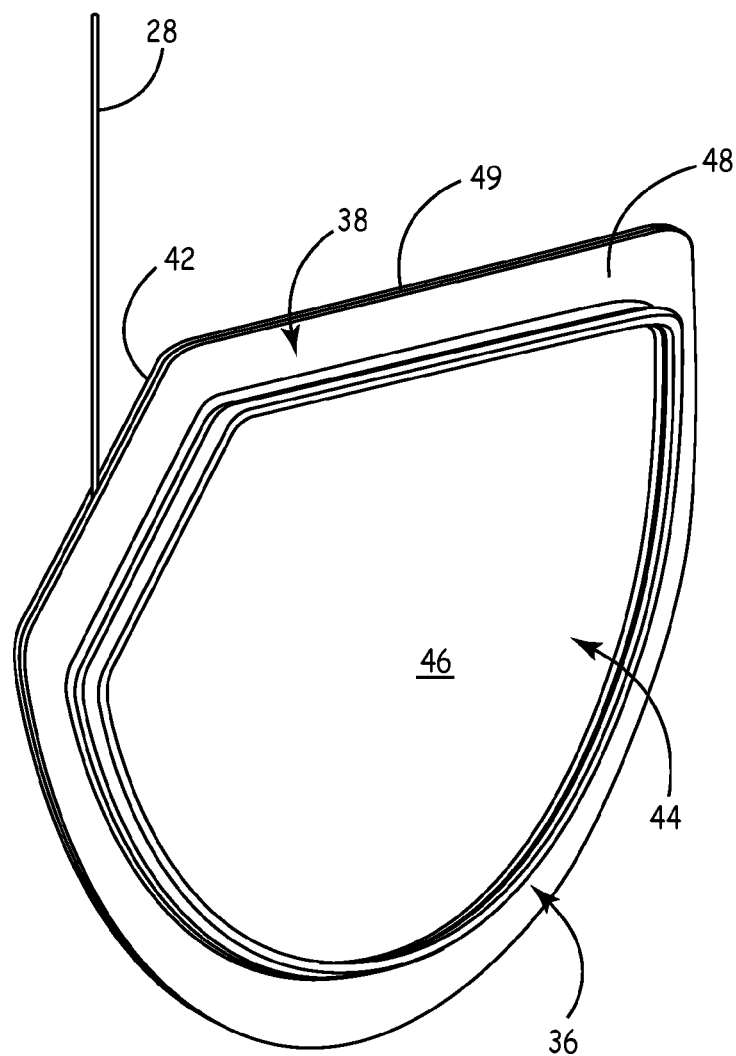
FIG. 3 is a perspective view of the components of FIG. 2 in an assembled state.

As shown in FIGS. 1-3, the energy storage device 10 can further include a separator assembly 36. As will be discussed, the separator assembly 36 can cover and substantially enclose the anode 26 such that the separator assembly 36 is disposed between the anode 26 and the cathode components 20, 22. However, it will be appreciated that the separator assembly 36 could be configured so as to cover and substantially enclose one of cathode components 20, 22 without departing from the scope of the present disclosure.

The separator assembly 36 can include a first portion 38. The first portion 38 can be a multi-layered sheet of material that includes a D-shaped main body 40 and a flange 42 that extends from one side of the main body 40. The separator assembly 36 can also include a second portion 44. The second portion 44 can also be a multi-layered sheet that includes a D-shaped main body 46 and a flange 48 that extends from one side of the periphery of the main body 46.

As shown in FIGS. 1-3, the main body 40 of the first portion 38 can substantially cover the first surface 30 of the anode 26, and the main body 46 of the second portion 44 can substantially cover the second surface 32 of the anode 26. Also, the flanges 42, 48 can extend over to substantially cover the periphery 34 of the anode 26. Specifically, the flange 42 of the first portion 38 can extend over and at least partially cover the periphery 34, and the flange 48 of the second portion 44 can extend over and at least partially cover the periphery 34 as well. The flanges 42, 48 can layer over each other and abut each other to cover the periphery 34 as shown in FIG. 3.

Furthermore, the flanges 42, 48 can be attached to each other so as to define a seam 49 of the separator assembly 36.

Accordingly, the separator assembly 36 can enclose the anode 26. As such, the separator assembly 36 can protect the anode 26 against damage due to vibration and other loads. Also, the separator assembly 36 can act as a thermal barrier to thus ensure proper operation of the anode 26.

Figure 5:
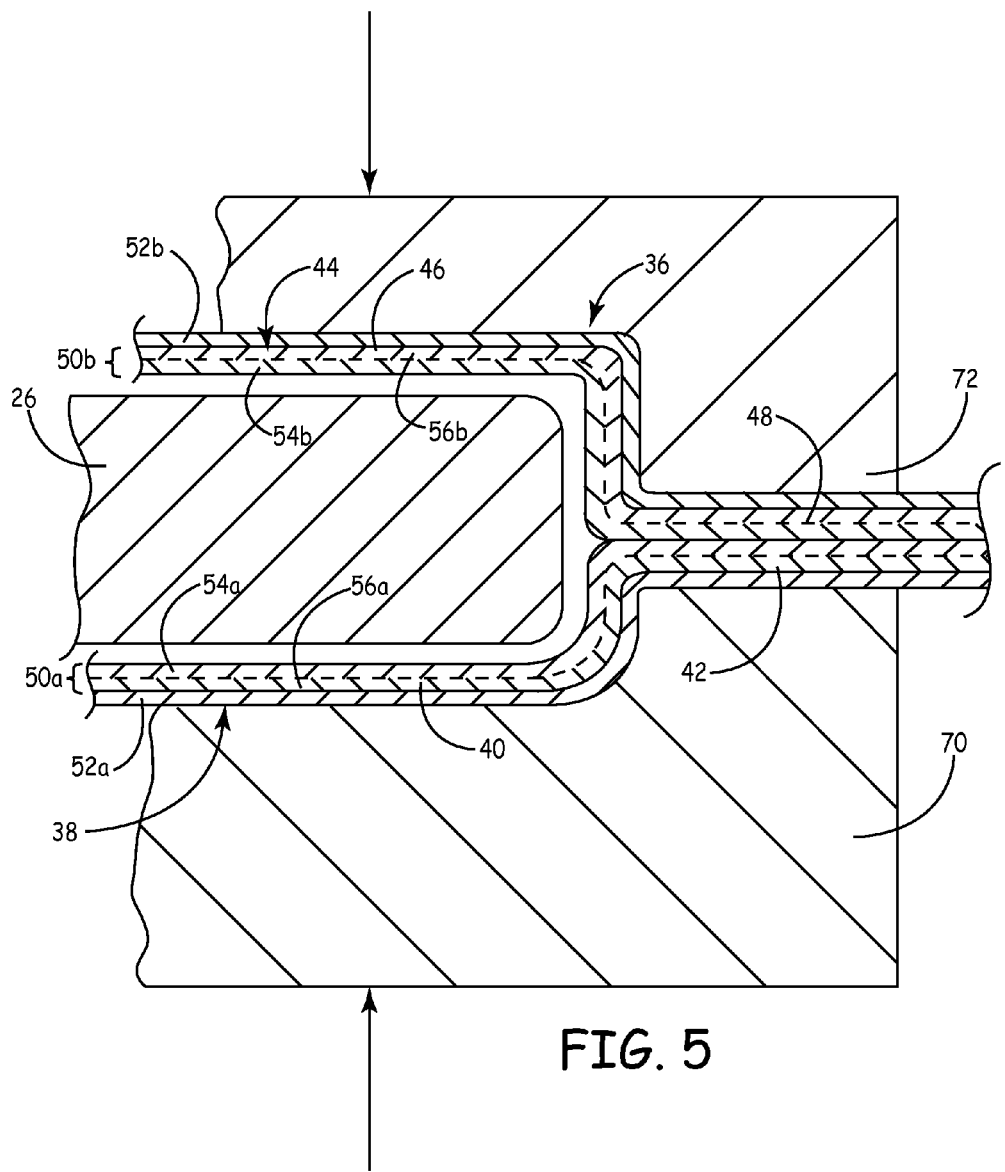
FIG. 5 is a sectional view of the manufacturing apparatus of FIG. 4 shown in an initial manufacturing step.
Figure 9:
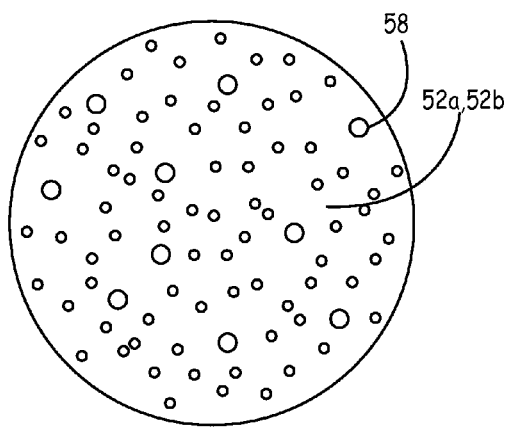
FIG. 9 is a top view of a second sheet of the energy storage device of FIG. 1.

As stated above, the first and second portions 38, 44 of the separator assembly 36 can each include a plurality of sheets of material. For instance, as shown in FIG. 5, the first and second portions 38, 44 of the separator assembly 36 can each include respective first sheets 50*a*, 50*b*, and respective second sheets 52*a*, 52*b*. The first sheets 50*a*, 50*b*, can be made from a different type of material than the second sheets 52*a*, 52*b*. For instance, the first sheets 50*a*, 50*b* can each include a polypropylene material, and the second sheets 52*a*, 52*b* can each include polytetrafluoroethylene (PTFE). More specifically, in some embodiments, the second sheets 52*a*, 52*b* can include expanded PTFE (ePTFE). Moreover, the second sheets 52*a*, 52*b* can be a porous sheet of material with a plurality of pores 58 as shown in FIG. 9. It will be appreciated, however, that the first and second sheets 50*a*, 50*b*, 52*a*, 52*b* can include any suitable material without departing from the scope of the present disclosure.

Figure 6:
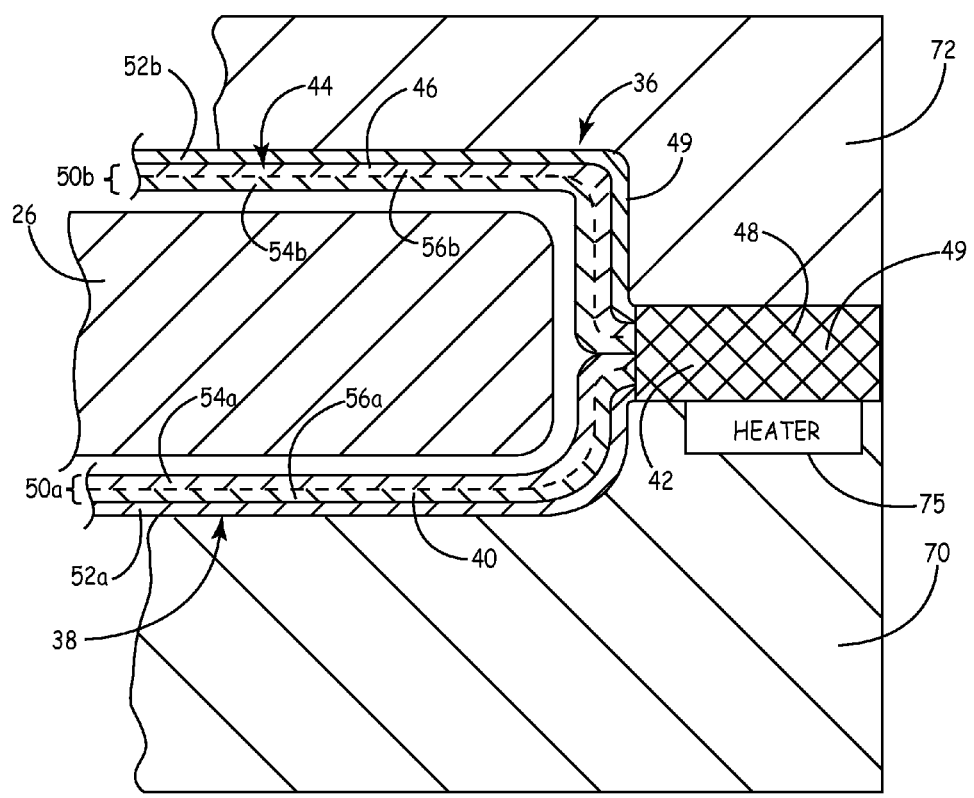
FIG. 6 is a sectional view of the manufacturing apparatus of FIG. 4 shown in an subsequent manufacturing step.

Each of the first sheets 50*a*, 50*b* can be attached to the respective second sheet 52*a*, 52*b* in any suitable fashion. For instance, as shown in FIG. 6, the first and second sheets 50*a*, 52*a* of the first portion 38 can be fixed along the flange 42 of the first portion 38, and the first and second sheets 50*b*, 52*b* of the second portion 44 can be fixed along the flange 48 of the second portion 44. Also, the first and second sheets 50*a*, 52*a* of the first portion 38 can be free from each other (i.e., unattached) at areas spaced away from the flange 42 (i.e., at main body 40 of the first portion 38). Likewise, the first and second sheets 50*b*, 52*b* of the second portion 44 can be similarly free from each other in areas spaced away from the flange 48 (i.e., at the main body 46 of the second portion 44).

When covering the anode 26, the first sheets 50*a*, 50*b* can abut the anode 26 as shown in FIG. 6. Also, the respective second sheets 52*a*, 52*b* can be spaced from the anode 26 and can face the cathode components 20, 22.

Figures 7, 8:
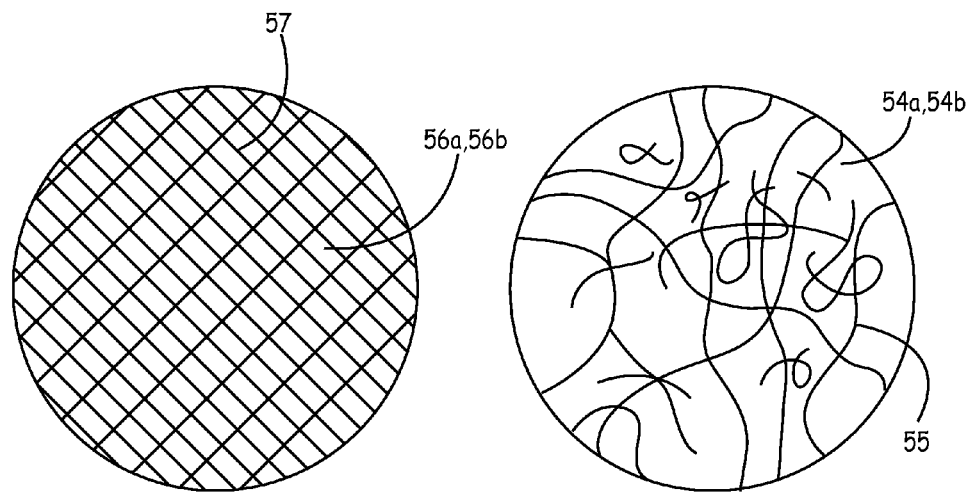
FIG. 7 is a top view of a regular layer of a first sheet of the energy storage device of FIG. 1.
FIG. 8 is a top view of a random layer of the first sheet of the energy storage device of FIG. 1.

Additionally, the first sheets 50*a*, 50*b* can each include a plurality of layers, including a respective first layer 54*a*, 54*b* and a respective second layer 56*a*, 56*b* (FIG. 6). Each of the first layers 54*a*, 54*b* can be layered over and integrally coupled to the respective second layer 56*a*, 56*b* so as to be monolithic. The first and second layers 54*a*, 54*b*, 56*a*, 56*b* can be made out of any suitable material. For instance, in some embodiments, the first layers 54*a*, 54*b* can include a random layer of polypropylene, and the second layers 56*a*, 56*b* can each include a regular layer of polypropylene. More specifically, the first layers 54*a*, 54*b* can each have a plurality of fibers 55 (FIG. 8) that are arranged in a substantially random manner. Also, the second layers 56*a*, 56*b* can each include a plurality of fibers 57 (FIG. 7) that are arranged in a substantially regular pattern (e.g., a criss-cross pattern), or the second layers 56*a*, 56*b* can each include an expanded material providing substantially regular porosity and mechanical stability. Also, the fibers 57 can be slightly spaced such that the second layers 56*a*, 56*b* are relatively porous. Moreover, in some embodiments, the first sheets 50*a*, 50*b* can be formed from a commercially available material, such as CELGARD™ 5550, available from Celgard LLC of Charlotte, N.C.

Thus, as shown in FIG. 6, the first and second sheets 50*a*, 50*b*, 52*a*, 52*b* can be layered over each other such that the first layers 54*a*, 54*b* are directly adjacent and abut the anode 26. Also, the second layers 56*a*, 56*b* can be disposed between the respective first layer 54*a*, 54*b* and the respective second sheet 52*a*, 52*b*. As such, the first sheet 50*a* of the first portion 38 can be layered directly over (i.e., abut) both the second sheet 52*a* of the first portion 38 and the first sheet 50*b* of the second portion 44 adjacent the seam 49.

Accordingly, the regular pattern of the fibers of the 57 of the second layers 56*a*, 56*b* can provide a good surface for forming the respective first layer 54*a*, 54*b*. Also, because of the random arrangement of the fibers 55 of the first layers 54*a*, 54*b*, the first layers 54*a*, 54*b* can provide substantial cushioning of the anode 26. Also, the material of the second sheets 52*a*, 52*b* can provide advantageous thermal characteristics (e.g., during assembly), thus maintaining proper operation of the anode 26 and the second layer 50*a*, 50*b*.

Figure 4:
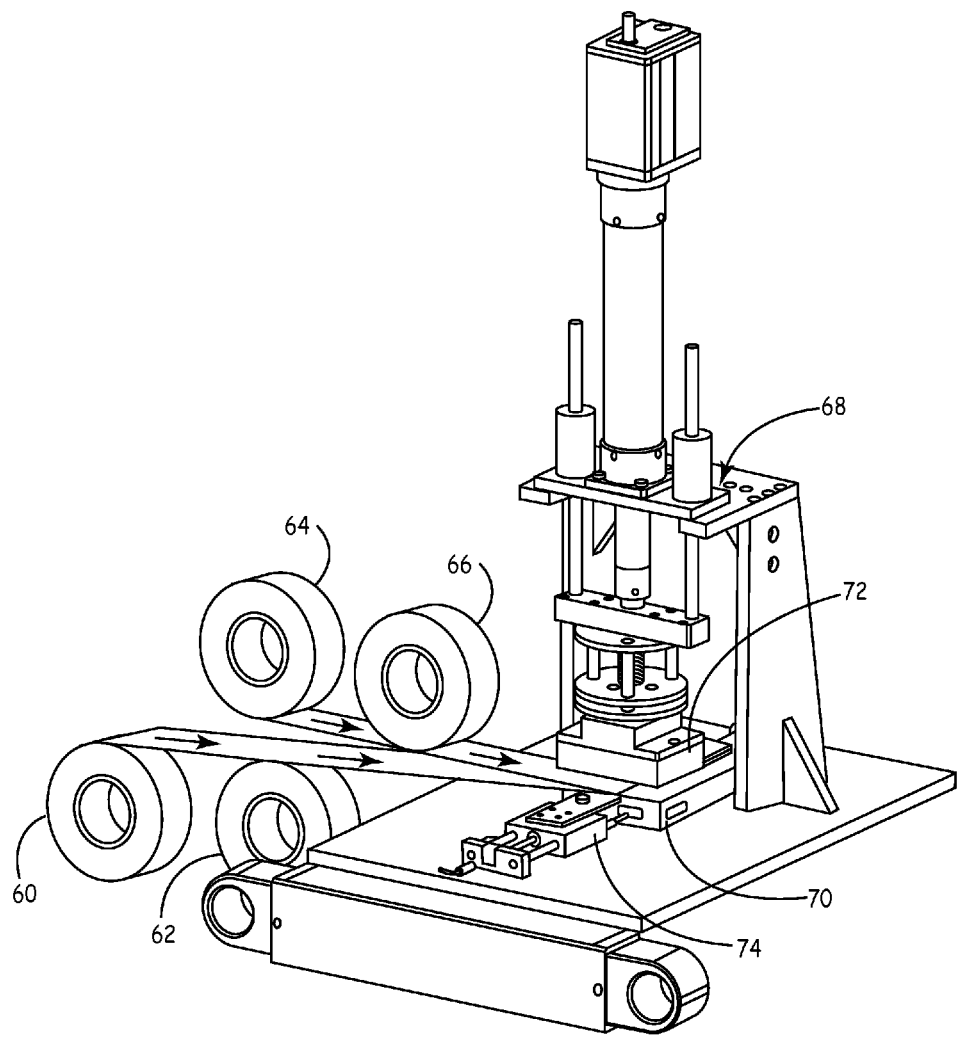
FIG. 4 is a schematic illustration of a manufacturing apparatus for manufacturing the energy storage device of FIG. 1.

Referring now to FIGS. 4, 5, and 6, a method of manufacturing the energy storage device 10 is illustrated according to various embodiments of the present disclosure. As shown in FIG. 4, bulk materials for manufacture of the first and second sheets 50*a*, 50*b*, 52*a*, 52*b* can be included on separate, respective rolls 60, 62, 64, 66. More specifically, a first roll 60 can include bulk material for the first sheet 50*a* of the first portion 38 of the separator assembly 36. A second roll 62 can include bulk material for the second sheet 52*a* of the first portion 38. Moreover, a third roll 64 can include bulk material for the first sheet 50*b* of the second portion 44. Likewise, a fourth roll 66 can include bulk materials for the second sheet 52*b* of the second portion 44.

Each of the rolls 60, 62, 64, 66 can unroll to advance the respective materials toward a press 68. The press 68 can include a first die 70 and a second die 72. The materials of the second and fourth rolls 62, 66 can be disposed immediately adjacent the first and second dies 70, 72, respectively. Also, the materials of the first and third rolls 60, 64 can be disposed between the materials of the second and fourth rolls 62, 66. The press 68 can actuate the first and/or second die 70, 72 relative to each other (i.e., toward and away from each other). Moreover, an actuator 74 can be included for automatically placing the anode 26 between the dies 70, 72.

Thus, the rolls 60, 62, 64, 66 can advance the materials of the first and second portions 38, 44 between the dies 70, 72. Then, the actuator 74 can selectively place the anode 26 between the materials of the first and third rolls 60, 64. Next, as shown in FIG. 5, the press 68 can actuate the first and second dies 70, 72 toward each other. Relative movement of the dies 70, 72 can cause the flanges 42, 48 of the first and second portions 38, 44 to extend over each other and the periphery 34 of the anode 26.

Then, as shown in FIG. 6, heat can be applied to a localized area of the dies 70, 72 by a heater 75. For instance, the heater 75 can apply heat to heat the flanges 42, 48 of the first and second portions 38, 44.

The pressure from the molds 70, 72 and the heat from the heater 75 can cause the first and second portions 38, 44 to melt into each other for attachment. More specifically, it will be appreciated that the melting point of the first sheets 50*a*, 50*b* can be lower than that of the second sheets 52*a*, 52*b*. For instance, the first sheets 50*a*, 50*b* can have a melting point of approximately 165° C., and the second sheets 52*a*, 52*b* can have a melting point of approximately 327° C. As such, the heater 75 can apply an elevated temperature between 165° C. and 327° C. to cause the first sheet 50*a* of the first portion 38 to melt and flow into the pores 58 (FIG. 9) of the second sheet 52*a* of the first portion 38. Likewise, heat from the heater 75 can cause the first sheet 50*b* of the second portion 44 to melt and flow into the pores 58 of the second sheet 52*b* of the second portion 44. Upon cooling and solidifying, the first and second sheets 50*a*, 52*a* of the first portion 38 can be fixedly attached, and the first and second sheets 50*b*, 52*b* of the second portion 44 can be fixedly attached. Moreover, pressure from the molds 70, 72 and heat from the heater 75 can substantially simultaneously attach the flanges 42, 48 of the first and second portions 38, 44 in a similar manner. More specifically, the first sheets 50*a*, 50*b* can melt into the pores 58 of the second sheets 52*a*, 52*b*, and upon cooling and solidifying, the first and second portions 38, 44 can be fixedly attached.

It will also be appreciated that the attachment of the first and second portions 38, 44 can occur substantially simultaneously with the attachment of the respective first and second sheets 50*a*, 50*b*, 52*a*, 52*b*. Accordingly, manufacturing can occur in a substantially efficient manner.

The first and second die 70, 72 can also be configured to cut the first and second portions 38, 44 from the bulk material of the respective rolls 60, 62, 64, 66. For instance, the die 70, 72 can include respective shearing features. Also, the heat applied from the heater 75 can melt the materials away from the bulk materials of the rolls 60, 62, 64, 66 in some embodiments. In still other embodiments, a separate cutter (not shown) can be used to cut the portions 38, 44 from the bulk material of the respective rolls 60, 62, 64, 66.

Once the separator assembly 36 is formed around the anode 26, further assembly of the energy storage device 10 can occur. For instance, the anode 26 and separator assembly 36 can be provided between the cathode components 20, 22 (FIG. 1) and other components of the device 10. Then, the first and second case components 12, 18 via a welding process, and the device 10 can be filled with electrolyte. Then, the device 10 can be provided in any suitable system for storing energy and providing power by creating a potential difference between the anode 26 and cathode components 20, 22 to generate an electrical field in the dielectric member(s) (not shown). When desired, the anode 26 and cathode components 20, 22 can build up charge and discharge via the leads 24, 28. Then, the leads 24, 28 can supply power to external components at predetermined intervals.

The foregoing description of the exemplary embodiments has been provided for purposes of illustration and description. It is not intended to be exhaustive or to limit the invention. Individual elements or features of a particular exemplary embodiment are generally not limited to that particular exemplary embodiment, but, where applicable, are interchangeable and can be used in a selected exemplary embodiment, even if not specifically shown or described. The same may also be varied in many ways. Such variations are not to be regarded as a departure from the invention, and all such modifications are intended to be included within the scope of the invention.

Exemplary embodiments are provided so that this disclosure will be thorough, and will fully convey the scope to those who are skilled in the art. Numerous specific details are set forth such as examples of specific components, devices, and methods, to provide a thorough understanding of exemplary embodiments of the present disclosure. It will be apparent to those skilled in the art that specific details need not be employed, that exemplary embodiments may be embodied in many different forms and that neither should be construed to limit the scope of the disclosure. In some exemplary embodiments, well-known processes, well-known device structures, and well-known technologies are not described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method of manufacturing an energy storage device comprising:
   covering a first surface of a first conductor with a first portion of a separator assembly;
   covering a second surface of the first conductor with a second portion of the separator assembly; and
   attaching the first and second portions together, at least one of the first and second portions including a first sheet and a second sheet, the first and second sheets including different materials; and
   attaching the first and second sheets together.

2. The method of manufacturing of claim 1, wherein attaching the first and second sheets comprises heating the first sheet to cause the first portion to flow into a plurality of pores of the second sheet and solidifying the first portion within the pores.

3. The method of manufacturing of claim 1, wherein the first sheet includes polypropylene and the second sheet includes polytetrafluoroethylene (PTFE).

4. The method of manufacturing of claim 1, wherein the first sheet includes a regular layer having a plurality of fibers arranged in a substantially regular pattern, the first sheet further including a random layer having a plurality of fibers that are arranged in a random manner, and further comprising providing the random layer between the first conductor and the regular layer.

5. The method of manufacturing of claim 4, further comprising abutting the random layer against the first conductor, and providing the regular layer between the random layer and the second sheet.

6. The method of manufacturing of claim 1, further comprising extending a flange of the second sheet over a flange of the first sheet, and attaching the flange of the second sheet to the flange of the first sheet.

7. The method of manufacturing of claim 1, further comprising substantially simultaneously attaching the first sheet to the second sheet and attaching the first portion to the second portion.

8. The method of manufacturing of claim 1, wherein each of the first and second portions includes a respective first sheet and a respective second sheet, and further comprising layering the first sheet of the second portion directly over the second sheet of the second portion and the first sheet of the first portion.

9. The method of manufacturing of claim 1, wherein attaching the first and second sheets together comprises attaching a periphery of the first sheet to a periphery of the second sheet and leaving the first and second sheets free from each other at an area spaced apart from the respective peripheries.

10. The method of manufacturing of claim 1, further comprising substantially enclosing the first conductor with the separator assembly, providing a second conductor on opposite sides of the first conductor, and encasing the first and second conductors in a case.

11. The method of manufacturing of claim 10, wherein the first conductor is an anode of a capacitor.

12. A capacitor comprising:
a case;
an anode disposed within the case;
a cathode disposed within the case, the cathode having a first cathode component and a second cathode component;
a separator assembly that substantially encloses the anode, the separator assembly disposed between the anode and the first and second cathode components, the separator assembly including a first portion that covers a first surface of the anode and a second portion that covers a second surface of the anode, the first and second portions each including a flange, the flanges extending over each other and attached to each other, the first and second portions each including a first sheet with a random layer and a regular layer, the first and second portions also each including a porous sheet that is layered over the respective first sheet, the random layer having a plurality of fibers that are arranged in a random manner, the regular layer having a plurality of fibers that are arranged in a substantially regular pattern, the porous sheet including a plurality of pores, the random layer of each of the first and second portions abutting the anode, the regular layer of each of the first and second portions being disposed between the respective random layer and the respective porous sheet, the random layers being flowed into and solidified in the pores of the first portion and in the pores of the second portion.

\* \* \* \* \*